United States Patent
Jeong et al.

(10) Patent No.: US 9,202,625 B2
(45) Date of Patent: Dec. 1, 2015

(54) LAMINATED CERAMIC ELECTRONIC COMPONENT AND METHOD OF FABRICATING THE SAME

(71) Applicant: Samsung Electro-Mechanics Co., Ltd., Suwon, Gyunggi-do (KR)

(72) Inventors: Han Soung Jeong, Suwon (KR); Chang Hoon Kim, Suwon (KR); Sang Hoon Kwon, Suwon (KR); Seok Hyun Yoon, Suwon (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 262 days.

(21) Appl. No.: 13/678,364

(22) Filed: Nov. 15, 2012

(65) Prior Publication Data

US 2014/0022698 A1    Jan. 23, 2014

(30) Foreign Application Priority Data

Jul. 20, 2012  (KR) .................. 10-2012-0079527

(51) Int. Cl.
*H01G 4/06* (2006.01)
*H01G 7/00* (2006.01)
*H01G 4/12* (2006.01)
*H01G 4/30* (2006.01)
*C04B 35/468* (2006.01)

(52) U.S. Cl.
CPC ............... *H01G 4/12* (2013.01); *C04B 35/468* (2013.01); *H01G 4/1227* (2013.01); *H01G 4/30* (2013.01); *C04B 2235/5445* (2013.01); *C04B 2235/5454* (2013.01); *C04B 2235/5472* (2013.01); *C04B 2235/782* (2013.01); *C04B 2235/784* (2013.01); *C04B 2235/785* (2013.01); *Y10T 156/1092* (2013.01)

(58) Field of Classification Search
CPC ......... H01G 4/30; H01G 4/1227; H01G 4/12; H01G 4/08; H01G 4/10
USPC .............................. 361/311, 321.2; 29/25.41
See application file for complete search history.

(56) References Cited

U.S. PATENT DOCUMENTS

| | | | |
|---|---|---|---|
| 6,947,276 B2 * | 9/2005 | Hirata et al. ............... | 361/306.3 |
| 2002/0141139 A1 * | 10/2002 | Nakamura et al. .......... | 361/321.2 |
| 2012/0050941 A1 * | 3/2012 | Murakawa et al. ........ | 361/321.1 |

FOREIGN PATENT DOCUMENTS

| | | |
|---|---|---|
| JP | 2005-243890 A | 9/2005 |
| JP | 2006-278615 A | 10/2006 |

* cited by examiner

*Primary Examiner* — Dion R Ferguson
(74) *Attorney, Agent, or Firm* — McDermott Will & Emery LLP

(57) ABSTRACT

There is provided a laminated ceramic electronic component, including a ceramic body including a dielectric layer; and first and second internal electrodes disposed to face each other, having the dielectric layer interposed therebetween within the ceramic body, wherein when a value of 1% is set to be D1, a value of 50% is set to be D50, and a value of 99% is set to be D99 in a cumulative distribution of dielectric grains by an average particle diameter thereof within the dielectric layer, $2 \leq D99/D50 \leq 3$ and $2 \leq D50/D1 \leq 3$ are satisfied. A high-capacity laminated ceramic electronic component may be implemented with improved adhesion between the dielectric layer and the internal electrode, and improved withstand voltage characteristics and excellent reliability may be implemented.

20 Claims, 3 Drawing Sheets

LAMINATED CERAMIC ELECTRONIC COMPONENT AND METHOD OF FABRICATING THE SAME

CROSS-REFERENCE TO RELATED APPLICATIONS

This application claims the priority of Korean Patent Application No. 10-2012-0079527 filed on Jul. 20, 2012, in the Korean Intellectual Property Office, the disclosure of which is incorporated herein by reference.

BACKGROUND OF THE INVENTION

1. Field of the Invention

The present invention relates to a high-capacity laminated ceramic electronic component with improved withstand voltage characteristics and excellent reliability.

2. Description of the Related Art

Recently, as electronic products have been miniaturized, demand for small, high-capacity laminated ceramic electronic components has increased.

Therefore, the thinning and laminating of a dielectric substance and an internal electrode have been attempted by various methods. Recently, a laminated ceramic electronic component having a thin dielectric layer and an increased number of laminations has been fabricated.

In addition, in order to implement the thinness in the dielectric layer, ceramic electronic parts with dielectric layers formed by using fine ceramic powder particles have been fabricated recently.

In this case, a surface roughness of the dielectric layer can be gradually reduced, but adhesion between the dielectric layer and the internal electrode is degraded accordingly.

This causes dalamination of the dielectric layer and the internal electrode during the fabricating of the laminated ceramic electronic component, thereby reducing the reliability of the laminated ceramic electronic component.

In addition, a dielectric constant may be reduced upon using only the fine ceramic powder particles.

On the other hand, when using ceramic powder particles having a relatively large particle size, withstand voltage characteristics may be degraded with the increased roughness of the dielectric layer.

SUMMARY OF THE INVENTION

An aspect of the present invention provides a high-capacity laminated ceramic electronic component with improved withstand voltage characteristics and excellent reliability.

According to an aspect of the present invention, there is provided a laminated ceramic electronic component, including: a ceramic body including a dielectric layer; and first and second internal electrodes disposed to face each other, having the dielectric layer interposed therebetween within the ceramic body, wherein when a value of 1% is set to be D1, a value of 50% is set to be D50, and a value of 99% is set to be D99 in a cumulative distribution of dielectric grains by an average particle diameter thereof within the dielectric layer, $2 \leq D99/D50 \leq 3$ and $2 \leq D50/D1 \leq 3$ are satisfied.

An average thickness td of the dielectric layer may satisfy $0.1\ \mu m \leq td \leq 0.5\ \mu m$.

The average thickness td of the dielectric layer and D50 in a value of 50% in the cumulative distribution of dielectric grains by an average particle diameter thereof may satisfy the relationship of $td/8 \leq D50 \leq td/3$.

When an average roughness of the dielectric layer on a central line thereof is Ra, $5\ nm \leq Ra \leq 30\ nm$ may be satisfied.

A ceramic powder used for the dielectric layer may include a first ceramic powder and a second ceramic powder having an average particle diameter smaller than that of the first ceramic powder.

The average particle diameter of the first ceramic powder may be 1.5 times to 4.5 times larger than that of the second ceramic powder.

The ceramic powder may include the first ceramic powder in an amount of 70 to 99 parts by weight and the second ceramic powder in an amount of 1 to 30 parts by weight.

According to another aspect of the present invention, there is provided a laminated ceramic electronic component, including: a ceramic body including a dielectric layer; and first and second internal electrodes disposed to face each other, having the dielectric layer interposed therebetween within the ceramic body, wherein when an average thickness of the dielectric layer is td, $0.1\ \mu m \leq td \leq 0.5\ \mu m$, and when a value of 1% is set to be D1, a value of 50% is set to be D50, and a value of 99% is set to be D99 in a cumulative distribution of dielectric grains by particle size within the dielectric layer, $2 \leq D99/D50 \leq 3$ and $2 \leq D50/D1 \leq 3$ are satisfied and $td/8 \leq D50 \leq td/3$ is satisfied.

When an average roughness of the dielectric layer on a central line thereof is Ra, $5\ nm \leq Ra \leq 30\ nm$ may be satisfied.

When an average thickness of the first and second internal electrodes is te, $0.1\ \mu m \leq te \leq 0.5\ \mu m$ may be satisfied.

The average thickness td of the dielectric layer may be the average thickness of the dielectric layer in a cross-section taken in length and thickness directions of the ceramic body cut in a central portion in a width direction thereof.

A ceramic powder used for the dielectric layer may include a first ceramic powder and a second ceramic powder having an average particle diameter smaller than that of the first ceramic powder, and the average particle diameter of the first ceramic powder may be 1.5 times to 4.5 times larger than that of the second ceramic powder.

The ceramic powder may include the first ceramic powder in an amount of 70 to 99 parts by weight and the second ceramic powder in an amount of 1 to 30 parts by weight.

According to another aspect of the present invention, there is provided a method of fabricating a laminated ceramic electronic component, including: preparing a ceramic green sheet using slurry including a first ceramic powder and a second ceramic powder having an average particle diameter smaller than that of the first ceramic powder; forming internal electrode patterns on the ceramic green sheet using a conductive metal paste; and forming a ceramic body including a dielectric layer and first and second internal electrodes disposed to face each other, having the dielectric layer interposed therebetween, by laminating and sintering the ceramic green sheet, wherein when a value of 1% is set to be D1, a value of 50% is set to be D50, and a value of 99% is set to be D99 in a cumulative distribution of a dielectric grin size within the dielectric layer, $2 \leq D99/D50 \leq 3$ and $2 \leq D50/D1 \leq 3$ are satisfied.

An average thickness td of the dielectric layer may satisfy $0.1\ \mu m \leq td \leq 0.5\ \mu m$.

An average thickness td of the dielectric layer and D50 in a value of 50% in the cumulative distribution of the dielectric grains by an average particle diameter thereof may satisfy the relationship of $td/8 \leq D50 \leq td/3$.

When an average roughness of the dielectric layer on a central line thereof is Ra, $5\ nm \leq Ra \leq 30\ nm$ may be satisfied.

The average particle diameter of the first ceramic powder may be 1.5 times to 4.5 times larger than that of the second ceramic powder.

The first ceramic powder may be contained in an amount of 70 to 99 parts by weight and the second ceramic powder may be contained in an amount of 1 to 30 parts by weight, with respect to an overall amount of ceramic powder.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
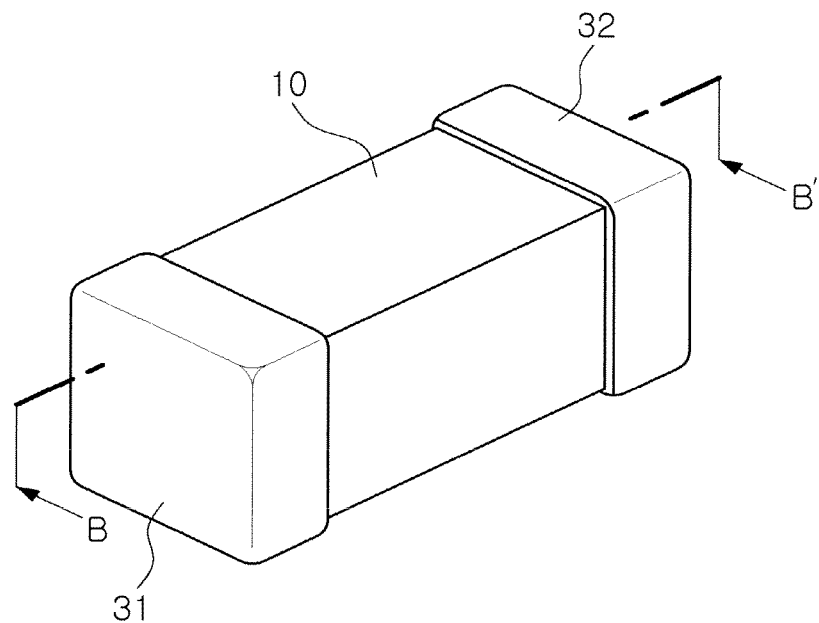
FIG. 1 is a perspective view schematically illustrating a laminated ceramic capacitor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

FIG. 1 is a perspective view schematically illustrating a laminated ceramic capacitor according to an embodiment of the present invention.

Figure 2:
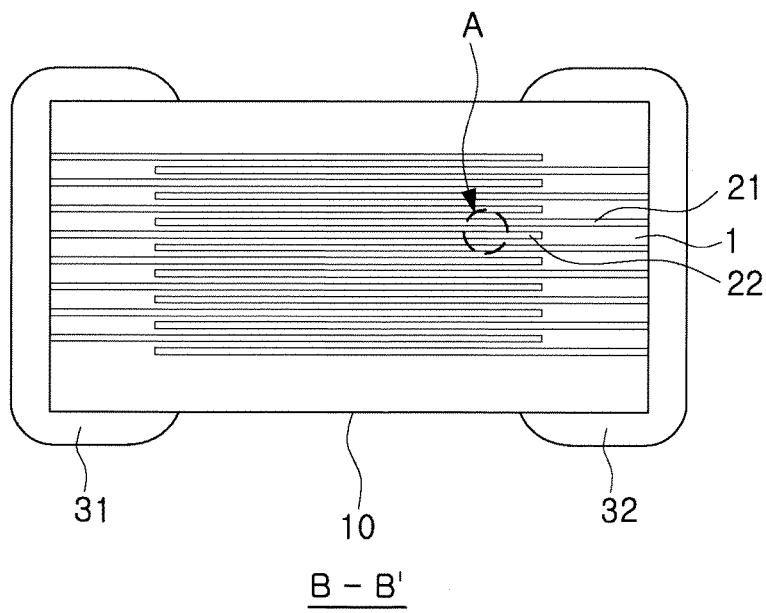
FIG. 2 is a cross-sectional view taken along line B-B' of FIG. 1.

FIG. 2 is a cross-sectional view taken along line B-B' of FIG. 1.

Figure 3:
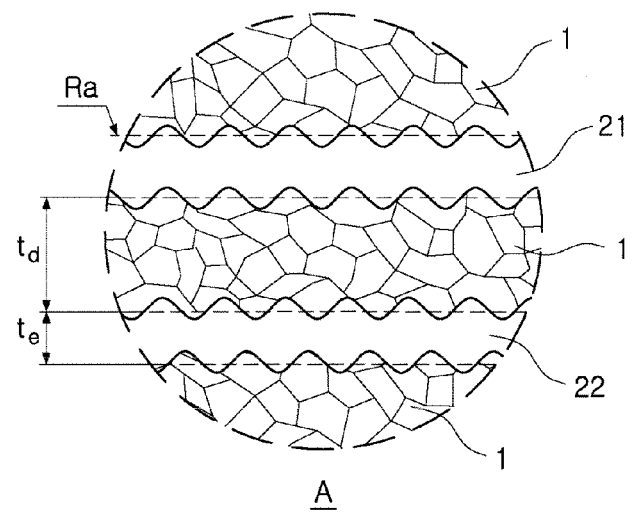
FIG. 3 is an enlarged view illustrating a thickness of an internal electrode layer and a dielectric layer in FIG. 2.

FIG. 3 is an enlarged view illustrating a thickness of an internal electrode layer and a dielectric layer in FIG. 2.

Referring to FIGS. 1 to 3, a laminated ceramic electronic component according to an embodiment of the present invention includes a ceramic body 10 including a dielectric layer 1, and first and second internal electrodes 21 and 22 disposed to face each other, having the dielectric layer 1 interposed therebetween within the ceramic body 10, wherein when a value in an amount of 1% is set to be D1, a value of 50% is set to be D50, and a value of 99% is set to be D99 in a cumulative distribution of dielectric grains by an average particle diameter thereof within the dielectric layer 1, $2 \leq D99/D50 \leq 3$ and $2 \leq D50/D1 \leq 3$ may be satisfied.

Hereinafter, a laminated ceramic electronic component according to the embodiment of the present invention will be described with reference to the accompanying drawings. In particular, the embodiment of the present invention describes a laminated ceramic capacitor, but is not limited thereto.

According to the embodiment of the present invention, a raw material forming the dielectric layer 1 is not particularly limited as long as sufficient capacitance can be obtained therewith. As the raw material, for example, barium titanate ($BaTiO_3$) may be used.

According to the purpose of the present invention, various types of ceramic additives, organic solvents, plasticizers, coupling agents, dispersing agents, and the like, may be added to powders such as barium titanate ($BaTiO_3$), and the like, as a material forming the dielectric layer 1.

The laminated ceramic capacitor according to the embodiment of the present invention may satisfy $2 \leq D99/D50 \leq 3$ and $2 \leq D50/D1 \leq 3$ when a value in an amount of 1% is set to be D1, a value of 50% is set to be D50, and a value of 99% is set to be D99 in a cumulative distribution of dielectric grains by an average particle diameter thereof within the dielectric layer 1.

In the embodiment of the present invention, the cumulative distribution of the dielectric grains by particle size, a cumulative function illustrating the measured dielectric grains by particle size in size order, may be represented by a distribution curve.

In the cumulative distribution of the dielectric grains by particle size, a particle distribution of a minimum particle size may be defined as a value in an amount of 1% and may be represented by D1.

Similarly, the particle distribution of a maximum particle size may be defined as a value of 99% and may be represented by D99, and in the cumulative distribution of the particle size of the entire dielectric grain, a value of 50% may be represented by D50.

High capacitance may be implemented by preventing a dielectric constant from being degraded and withstand voltage characteristics may be improved by reducing the roughness of the dielectric layer, by controlling the dielectric grains by particle size so as to satisfy the relationship between $2 \leq D99/D50 \leq 3$ and $2 \leq D50/D1 \leq 3$, in the cumulative distribution of the dielectric grains by particle size within the dielectric layer 1.

When the values of D99/D50 and D50/D1 are less than 2, delamination defects may occur and it may be difficult to implement capacitance, and when the values of D99/D50 and D50/D1 exceed 3, withstand voltage characteristics may be degraded due to the increased roughness of the dielectric layer.

According to the embodiment of the present invention, the cumulative distribution of the dielectric grains by particle size may be measured by analyzing a section of the dielectric layer extracted by a scanning electron microscope (SEM). The dielectric grains by particle size may be measured using grain size measuring software that supports an average grain size standard measuring method defined in the American Society for Testing and Materials (ASTM) E112.

The cumulative distribution of the dielectric grains by particle size may be appreciated by arranging the measured dielectric grains by particle size in a size order.

According to the embodiment of the present invention, an average thickness td of the dielectric layer may satisfy $0.1 \, \mu m \leq td \leq 0.5 \, \mu m$.

According to the embodiment of the present invention, the average thickness of the dielectric layer 1 may refer to the average thickness of the dielectric layer 1, interposed between the internal electrode layers 21 and 22.

The average thickness of the dielectric layer 1 may be measured by performing image scanning on a section in a length direction of the ceramic body 10 with a scanning electron microscope (SEM) as shown in FIG. 2.

For example, as shown in FIG. 2, a thickness of any dielectric layer extracted from an image obtained by scanning a section in a length and thickness direction (L-T) of the ceramic body 10 cut in a central portion in a width (W) direction thereof by the SEM is measured at 30 equidistant points in a length direction, such that an average value thereof may be measured.

The 30 equidistant points may be measured in a capacitance forming part referring to an area in which the internal electrode layers 21 and 22 overlap each other.

Further, when an average value of the thickness of the dielectric layer is obtained by measuring the thickness of at least 10 dielectric layers, the average thickness of the dielectric layer may be further generalized.

High capacitance may be implemented by preventing a dielectric constant from being degraded and withstand voltage characteristics may be improved by reducing the roughness of the dielectric layer, by controlling the dielectric grains by particle size so as to satisfy the relationship between 2≤D99/D50≤3 and 2≤D50/D1≤3, in the cumulative distribution of the dielectric grains by particle size within the dielectric layer 1 when the average thickness td of the dielectric layer satisfies 0.1 μm≤td≤0.5 μm.

That is, when the average thickness td of the dielectric layer exceeds 0.5 μm, the thickness of the dielectric layer is sufficiently thick and thus, withstand voltage characteristic may not be degraded.

According to the embodiment of the present invention, the average thickness td of the dielectric layer and D50 in a cumulative distribution value of dielectric grains by an average particle diameter thereof of 50% may satisfy the relationship of td/8≤D50≤td/3.

As described above, high capacitance may be implemented by preventing the dielectric constant from being degraded and withstand voltage characteristics may be improved by reducing the roughness of the dielectric layer, by controlling the td and D50 so as to satisfy the relationship of td/8≤D50≤td/3.

When the value of D50 is less than td/8, the particle size of the ceramic powder is relatively too small and thus, it may be difficult to secure capacitance due to degradation in the dielectric constant.

Further, when the value of D50 exceeds td/3, the surface roughness of the dielectric layer is increased and thus, withstand voltage characteristics may be degraded.

Figure 4:
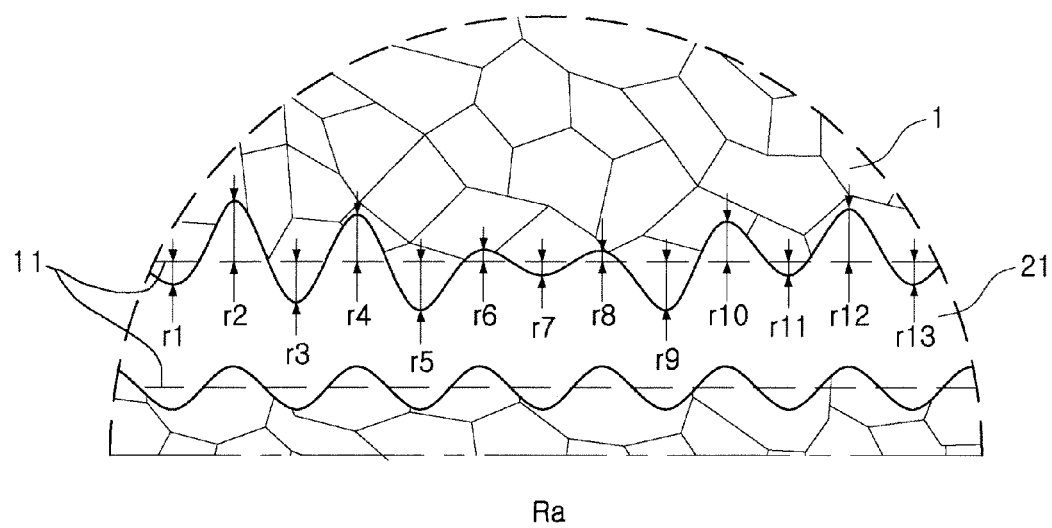
FIG. 4 is a schematic diagram illustrating a center line average roughness of the dielectric layer in FIG. 3.

FIG. 4 is a schematic diagram illustrating an average roughness Ra of a central line of the dielectric layer in FIG. 3.

Referring to FIG. 4, the laminated ceramic capacitor according to the embodiment of the present invention may satisfy 5 nm≤Ra≤30 nm when the average roughness of the central line of the dielectric layer 1 is Ra.

The average roughness Ra of the central line of the dielectric layer, a value obtained by calculating surface roughness of the dielectric layer, may refer to the roughness of the dielectric layer calculated by obtaining an average value based on a virtual central line 11 of the roughness.

In detail, referring to FIG. 4, a method of calculating the average roughness Ra of the central line of the dielectric layer may include drawing a virtual central line 11 on the roughness formed on one surface of the dielectric layer.

Next, the average roughness Ra of the central line of the dielectric layer may be calculated by a value calculated by measuring each distance (for example, $r_1, r_2, r_3, \ldots, r_{13}$) based on the virtual central line 11 of the roughness and then, obtaining the average value of each distance depending on the following Equation.

$$Ra = \frac{r_1 + r_2 + r_3 + \ldots r_n}{n}$$

When the average roughness of the central line of the dielectric layer 1 is Ra, the laminated ceramic capacitor with the improved withstand voltage characteristics, improved adhesion between the dielectric layer and the internal electrode and excellent reliability thereof may be implemented, by controlling the average roughness so as to satisfy 5 nm≤Ra≤30 nm.

When the average roughness Ra of the central line of the dielectric layer 1 is less than 5 nm, delamination defects may occur due to low roughness.

On the other hand, when the average roughness Ra of the central line of the dielectric layer 1 exceeds 30 nm, the roughness is increased and thus, a short circuit occurs, which may lead to the degradation in withstand voltage characteristics.

According to the embodiment of the present invention, high capacitance may be implemented by preventing the dielectric constant of the laminated ceramic capacitor from being degraded. Meanwhile, the ceramic powder used for the dielectric layer so as to improve withstand voltage characteristics by reducing the roughness of the dielectric layer may include a first ceramic powder and a second ceramic powder having an average particle diameter smaller than that of the first ceramic powder.

In detail, so as to satisfy the relationship of 2≤D99/D50≤3 and 2≤D50/D1≤3 in the cumulative distribution of the dielectric grains by particle size within the dielectric layer 1, the ceramic powder used for the dielectric layer may include the first and second ceramic powders having different average particle diameters.

The average particle diameter of the first ceramic powder is not particularly limited and may be, for example, 1.5 times to 4.5 times larger than that of the second ceramic powder.

When the average particle diameter of the first ceramic powder is 1.5 times less than that of the second ceramic powder, the difference in the particle size of the ceramic powder is relatively small and thus, it may be difficult to secure capacitance, and when the average particle diameter of the first ceramic powder exceeds 4.5 times, withstand voltage characteristics may be degraded due to the increase in the surface roughness of the dielectric layer.

The particle size of the ceramic powder is not particularly limited. For example, the first ceramic powder and the second ceramic powder may be mixed with each other so that the average particle diameter of the first ceramic powder is 200 nm or less and the average particle diameter of the second ceramic powder is 50 nm or less.

In addition, in the ceramic powder particles, a mixing ratio of the first and second ceramic powders is not particularly limited. For example, the ceramic powder may include the first ceramic powder in an amount of 70 to 90 parts by weight and the second ceramic powder in an amount of 1 to 30 parts by weight.

A material forming the first and second internal electrode layers 21 and 22 is not particularly limited. For example, the first and second internal electrode layers 21 and 22 may be formed of a precious metal such as palladium (Pd), a palladium-silver (Pd—Ag) alloy, and the like, and conductive paste including at least one of nickel (Ni) and copper (Cu).

Meanwhile, for forming capacitance, external electrodes 31 and 32 may be formed on exterior surfaces of the ceramic body 10 and may be electrically connected with the internal electrode layers 21 and 22.

The external electrodes 31 and 32 may be formed of conductive materials of the same material as the internal electrode but are not limited thereto and may be formed of, for example, copper (Cu), silver (Ag), nickel (Ni), and the like.

The external electrodes 31 and 32 may be formed by applying and firing a conductive paste prepared by adding glass frit to metal powder.

Meanwhile, a laminated ceramic electronic component according to another embodiment of the present invention includes the ceramic body 10 including the dielectric layer 1, and the first and second internal electrodes 21 and 22 disposed to face each other, having the dielectric layer 1 interposed therebetween within the ceramic body 10, wherein when the average thickness of the dielectric layer 1 is td, $0.1\ \mu m \leq td \leq 0.5\ \mu m$ may be satisfied, and when a value in an amount of 1% is set to be D1, a value of 50% is set to be D50, and a value of 99% is set to be D99 in the cumulative distribution of the dielectric grains by particle size within the dielectric layer 1, $2 \leq D99/D50 \leq 3$ and $2 \leq D50/D1 \leq 3$ may be satisfied and $td/8 \leq D50 \leq td/3$ may be satisfied.

When the average roughness of the central line of the dielectric layer is Ra, $5\ nm \leq Ra \leq 30\ nm$ may be satisfied.

The average thickness td of the dielectric layer may be the average thickness of the dielectric layer in a cross-section taken in length and thickness directions (L-T) of the ceramic body cut in a central portion in a width (W) direction thereof.

The ceramic powder used for the dielectric layer may include the first ceramic powder and the second ceramic powder having an average particle diameter smaller than that of the first ceramic powder, and the average particle diameter of the first ceramic powder may be 1.5 to 4.5 times larger than that of the second ceramic powder.

Further, the ceramic powder may include the first ceramic powder in an amount of 70 to 99 parts by weight and the second ceramic powder in an amount of 1 to 30 parts by weight.

Referring to FIGS. 2 and 3, the laminated ceramic capacitor according to the embodiment of the present invention may satisfy $0.1\ \mu m \leq te \leq 0.5\ \mu m$ when the average thickness of the first and second internal electrodes is te.

According to the embodiment of the present invention, the average thickness of the internal electrode layers 21 and 22 may be measured by performing image scanning on a section in a length direction of the ceramic body 10 by the SEM as shown in FIG. 2.

For example, as shown in FIG. 2, a thickness of any internal electrode layer extracted from an image obtained by scanning a section in length and thickness directions (L-T) of the ceramic body 10 cut in a central portion in a width (W) direction thereof by the SEM is measured at 30 equidistant points in a length direction, such that an average value thereof may be measured.

The 30 equidistant points may be measured in a capacitance forming part referring to an area in which the internal electrode layers 21 and 22 overlap each other.

Further, when an average value of the thickness of the internal electrode layer is obtained by measuring the thickness of at least 10 internal electrode layers, the average thickness of the internal electrode layer may be further generalized.

In a laminated ceramic electronic component according to another embodiment of the present invention, a description of the overlapping parts of the laminated ceramic electronic component according to the embodiment of the present invention as described above will be omitted herein.

Figure 5:
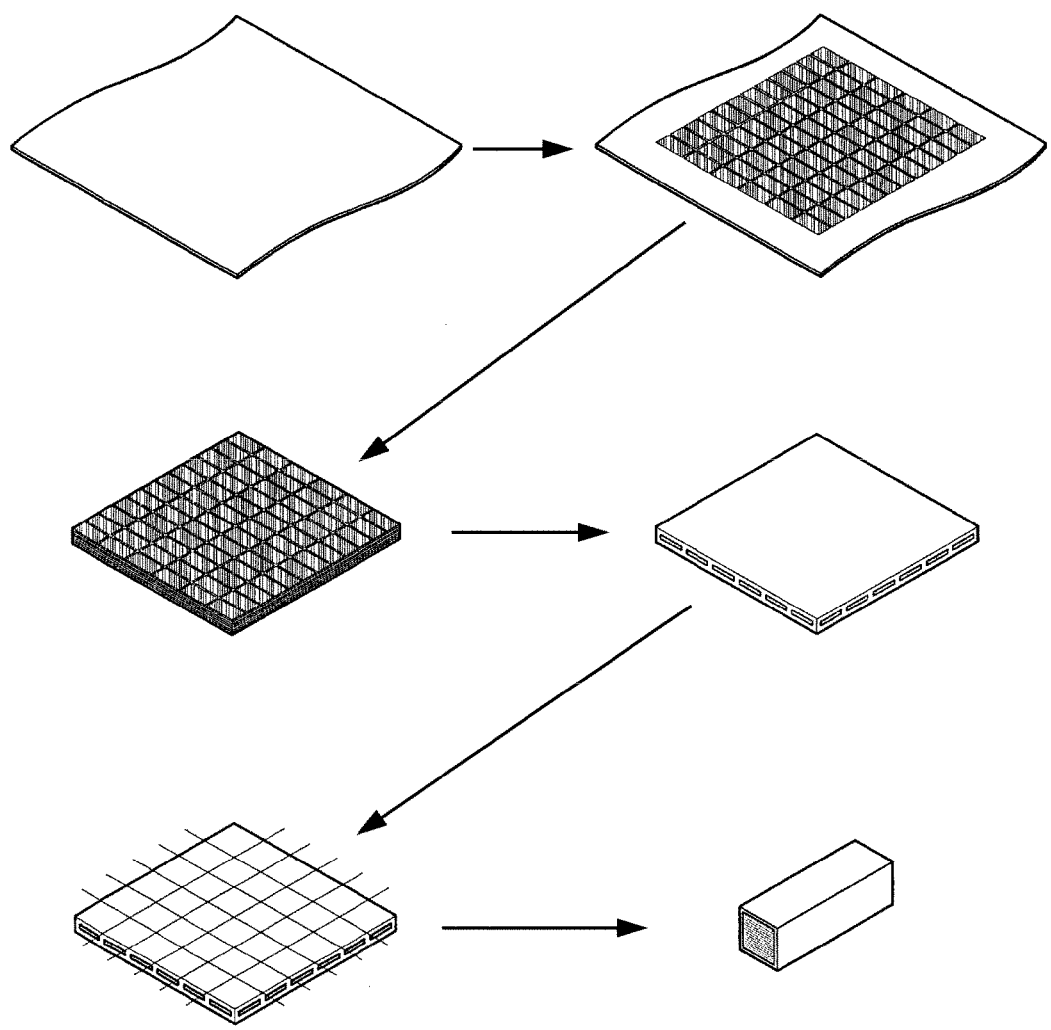
FIG. 5 is a fabricating process diagram of a laminated ceramic capacitor according to another embodiment of the present invention.

FIG. 5 is a fabricating process diagram of a laminated ceramic capacitor according to another embodiment of the present invention.

Referring to FIG. 5, a method of fabricating a laminated ceramic electronic component according to another embodiment of the present invention includes preparing a ceramic green sheet using slurry including the first ceramic powder and the second ceramic powder having an average particle diameter smaller than that of the first ceramic powder, forming internal electrode patterns on the ceramic green sheet using the conductive metal paste, and forming the ceramic body including the dielectric layer and the first and second internal electrodes disposed to face each other, having the dielectric layer interposed therebetween, by laminating and sintering the ceramic green sheet, wherein when a value in an amount of 1% is set to be D1, a value of 50% is set to be D50, and a value of 99% is set to be D99 in the cumulative distribution of the dielectric grains by particle size within the dielectric layer, $2 \leq D99/D50 \leq 3$ and $2 \leq D50/D1 \leq 3$ may be satisfied.

In a method of fabricating a laminated ceramic electronic component according to the embodiment of the present invention, the ceramic green sheet including a dielectric substance may be first prepared.

The ceramic green sheet may be fabricated by preparing slurry by mixing a ceramic powder, a binder, and a solvent and preparing the slurry in a sheet shape having a thickness of several μm by a Doctor blade method.

The ceramic green sheet may be prepared using slurry including the first ceramic powder and the second ceramic powder having an average particle diameter smaller than that of the first ceramic powder.

The average particle diameter of the first ceramic powder may be 1.5 times to 4.5 times larger than that of the second ceramic powder.

Further, the ceramic powder may include the first ceramic powder in an amount of 70 to 99 parts by weight and the second ceramic powder in an amount of 1 to 30 parts by weight.

Next, the internal electrode patterns may be formed on the ceramic green sheet using the conductive metal paste.

Next, the ceramic body including the dielectric layer and the first and second internal electrodes disposed to face each other, having the dielectric layer interposed therebetween may be formed by laminating and sintering the green sheets on which the internal electrode patterns are formed.

In particular, according to another embodiment of the present invention, a laminated ceramic electronic component may satisfy $2 \leq D99/D50 \leq 3$ and $2 \leq D50/D1 \leq 3$ when a value in an amount of 1% is set to be D1, a value of 50% is set to be D50, and a value of 99% is set to be D99 in a cumulative distribution of the dielectric grains by particle size within the dielectric layer 1.

The average thickness td of the dielectric layer may satisfy $0.1\ \mu m \leq td \leq 0.5\ \mu m$.

The average thickness td of the dielectric layer and D50 in a cumulative distribution value of dielectric grains by an average particle diameter thereof of 50% may satisfy the relationship of $td/8 \leq D50 \leq td/3$.

When the average roughness of the central line of the dielectric layer is Ra, $5\ nm \leq Ra \leq 30\ nm$ may be satisfied.

The description of the features and the same parts of the laminated ceramic electronic component according to the embodiment of the present invention will be omitted herein.

Hereinafter, an example of the present invention will be described in more detail, but the present invention is not limited thereto.

The present embodiment was performed to test how much the reliability is improved according to the values of D1, D50, and D99 in the cumulative distribution of the dielectric grains by particle size within the dielectric layer, a mixing ratio between the ceramic particles having different average particle diameters used for the dielectric layer, the average roughness Ra of the central line of the dielectric layer, in the case of the laminated ceramic capacitor to which the dielectric layer having the average thickness of 0.1 μm≤td≤0.5 μm is applied.

The laminated ceramic capacitor according to the present embodiment was fabricated according to the following process.

First, the dielectric layer 1 was formed by preparing the plurality of ceramic green sheets fabricated by applying and drying the slurry formed including the powder such as barium titanate ($BaTiO_3$), and the like, on a carrier film.

The barium titanate ($BaTiO_3$) powder was used in a form in which the first ceramic powder having an average particle diameter of 200 nm and the second ceramic powder having an average particle diameter of 50 nm were mixed.

Next, a laminate was fabricated by forming the internal electrode in a process of preparing the conductive paste for the internal electrode and then applying the conductive paste for the internal electrode to the green sheet by a screen printing method, and then, by laminating 190 to 250 layers thereof.

Next, a chip of a size of a 0603 standard was fabricated by compressing and cutting the laminate and the chip was fired at a temperature of 1050 to 1200° C. under a reduction atmosphere of 0.1% or less of $H_2$.

Next, the laminated ceramic capacitor was fabricated through processes such as external electrode formation, plating, and the like.

As a result of observing a section of samples of the laminated ceramic capacitor, the average thickness of the internal electrode was implemented as about 0.10 to 0.50 μm and the average thickness of the dielectric layer was implemented as 0.10 to 0.80 μm.

The following table 1 is a table illustrating comparison results of breakdown voltage (BDV) depending on the average thickness td of the dielectric layer and the ratio of D99/D50 and D50/D1.

TABLE 1

| Sample N0. | Thickness of Dielectric Layer (td) (μm) | D99/D50 | D50/D1 | BDV (Max. 60 V) Breakdown or not |
|---|---|---|---|---|
| 1 | 0.2 | 3.5 | 2.2 | ○ |
| 2 | 0.15 | 3.3 | 1.9 | ○ |
| 3 | 0.1 | 3.1 | 1.8 | ○ |
| 4 | 0.4 | 2.6 | 3.3 | ○ |
| 5 | 0.2 | 2.7 | 3.2 | ○ |
| 6 | 0.5 | 3.3 | 3.3 | ○ |
| 7 | 0.3 | 3.2 | 3.5 | ○ |
| *8 | 0.6 | 3.3 | 1.9 | X |
| *9 | 0.7 | 2.7 | 3.2 | X |
| *10 | 0.8 | 3.2 | 2.5 | X |

In Table 1, breakdown voltage (BDV) was evaluated while applying DC voltage at a speed of 1.0 V/sec and the case in which breakdown occurred at a breakdown voltage of 60V is marked by 0, while the case in which breakdown did not occur is marked by X.

Referring to Table 1 above, in the case in which the average thickness td of the dielectric layer satisfied 0.1 μm≤td≤0.5 μm, the breakdown occurred when the ratio of D99/D50 and D50/D1 deviated from the numerical range of the present invention, thereby causing the problem of the reliability test.

On the other hand, in the case of samples 8, 9, and 10 in which the average thickness td of the dielectric layer exceeded 0.5, the thickness of the dielectric layer was relatively thick and therefore, breakdown did not occur. Therefore, it can be appreciated that withstand voltage characteristics were not affected.

Therefore, it can be appreciated from the following description that a laminated ceramic electronic component according to the embodiment of the present invention has improved withstand voltage characteristics since the values of D99/D50 and D50/D1 are in the numerical range of the present invention, when the average thickness td of the dielectric layer satisfies 0.1 μm≤td≤0.5 μm.

The following Table 2 is a table illustrating comparison results whether breakdown and delamination occur according to the mixing ratio between the ceramic powder particles having different average particle diameters used for the dielectric layer, the average thickness of the dielectric layer 1, D50, D99/D50, and D50/D1, and the average roughness Ra of the central line of the dielectric layer.

TABLE 2

| Sample N0. | Mixing Ratio of First ceramic powder/Second ceramic powder | Thickness of Dielectric Layer (td) (μm) | D50 (μm) | D99/D50 | D50/D1 | Ra (nm) | BDV (Max. 60 V) Breakdown or not | Occurrence of Delamination (○, X) |
|---|---|---|---|---|---|---|---|---|
| Comparative Example 1 | 10/1 | 0.5 | 0.1 | 2.5 | 3.1 | 4 | ○ | ○ |
| Comparative Example 2 | 8/1 | 0.5 | 0.1 | 3.2 | 2.5 | 10 | ○ | X |
| Comparative Example 3 | 6/1 | 0.5 | 0.1 | 3.2 | 3.3 | 20 | ○ | X |
| Comparative Example 4 | 5/1 | 0.5 | 0.1 | 1.9 | 3.2 | 30 | ○ | X |
| Comparative Example 5 | 4/1 | 0.5 | 0.1 | 3.5 | 2.4 | 35 | ○ | X |
| Comparative Example 6 | 10/1 | 0.5 | 0.05 | 3.3 | 2.9 | 10 | ○ | X |
| Example 1 | 8/1 | 0.5 | 0.1 | 2.6 | 2.4 | 10 | X | X |
| Example 2 | 6/1 | 0.5 | 0.1 | 2.1 | 2.7 | 15 | X | X |
| Example 3 | 5/1 | 0.5 | 0.1 | 2.2 | 2.9 | 20 | X | X |
| Example 4 | 4/1 | 0.5 | 0.1 | 2.2 | 2.6 | 30 | X | X |
| Comparative Example 7 | 10/1 | 0.5 | 0.15 | 2.8 | 3.5 | 35 | ○ | X |

TABLE 2-continued

| Sample NO. | Mixing Ratio of First ceramic powder/Second ceramic powder | Thickness of Dielectric Layer (td) (μm) | D50 (μm) | D99/D50 | D50/D1 | Ra (nm) | BDV (Max. 60 V) Breakdown or not | Occurrence of Delamination (○, X) |
|---|---|---|---|---|---|---|---|---|
| Example 5 | 8/1 | 0.3 | 0.08 | 2.8 | 2.9 | 30 | X | X |
| Comparative Example 8 | 6/1 | 0.5 | 0.1 | 1.9 | 1.9 | 4 | ○ | ○ |
| Comparative Example 9 | 5/1 | 0.2 | 0.07 | 2.5 | 1.8 | 20 | ○ | X |
| Example 6 | 4/1 | 0.3 | 0.05 | 2.8 | 2.2 | 25 | X | X |
| Example 7 | 10/1 | 0.4 | 0.05 | 2.5 | 2.7 | 10 | X | X |
| Example 8 | 8/1 | 0.5 | 0.09 | 2.2 | 2.0 | 15 | X | X |
| Comparative Example 10 | 6/1 | 0.3 | 0.05 | 3.9 | 3.1 | 30 | ○ | X |
| Example 9 | 5/1 | 0.4 | 0.07 | 2.7 | 2.8 | 10 | X | X |
| Example 10 | 4/1 | 0.35 | 0.07 | 2.5 | 2.5 | 20 | X | X |
| Example 11 | 6/1 | 0.35 | 0.07 | 2.2 | 2.8 | 30 | X | X |
| Example 12 | 8/1 | 0.35 | 0.06 | 2.1 | 2.5 | 25 | X | X |
| Example 13 | 6/1 | 0.45 | 0.1 | 2.6 | 2.8 | 30 | X | X |

As can be appreciated from Table 2 above, in the case of the comparative example in which the average thickness td of the dielectric layer satisfies 0.1 μm≤td≤0.5 μm and the mixing ratio of the ceramic powder having different average particle diameters deviates from the numerical range of the present invention, breakdowns may occur and delamination may occur when the maximum voltage of the breakdown voltage (BDV) is 60V, thereby causing the problem of the reliability.

In addition, in the case in which D50, D99/D50, and D50/D1, and the average roughness Ra of the central line of the dielectric layer deviated from the numerical range of the present invention, breakdown also occurred and the delamination occurred when the maximum voltage of the breakdown voltage (BDV) was 60V, thereby causing the problem of the reliability.

On the other hand, in examples 1 to 13, satisfying the numerical range of the present invention, when the average thickness td of the dielectric layer satisfied 0.1 μm≤td≤0.5 μm, breakdown did not occur and delamination did not occur, such that the laminated ceramic capacitor with the excellent withstand voltage characteristics and reliability may be implemented.

As set forth above, according to an embodiment of the present invention, a high-capacity laminated ceramic electronic component having the improved adhesion between the dielectric layer and the internal electrode and having withstand voltage characteristics and excellent reliability may be implemented.

While the present invention has been shown and described in connection with the embodiments, it will be apparent to those skilled in the art that modifications and variations can be made without departing from the spirit and scope of the invention as defined by the appended claims.

What is claimed is:

1. A laminated ceramic electronic component, comprising:
a ceramic body including a dielectric layer; and
first and second internal electrodes disposed to face each other, having the dielectric layer interposed therebetween within the ceramic body,
in a cumulative distribution of dielectric grains by an average particle diameter thereof within the dielectric layer, when a value of 1% is set to be D1, a value of 50% is set to be D50, and a value of 99% is set to be D99, 2≤D99/D50≤3 and 2≤D50/D1≤3 being satisfied.

2. The laminated ceramic electronic component of claim 1, wherein an average thickness td of the dielectric layer satisfies 0.1 μm≤td≤0.5 μm.

3. The laminated ceramic electronic component of claim 1, wherein the average thickness td of the dielectric layer and D50 in a value of 50% in the cumulative distribution of dielectric grains by an average particle diameter thereof satisfy the relationship of td/8≤D50≤td/3.

4. The laminated ceramic electronic component of claim 1, wherein when an average roughness of the dielectric layer on a central line thereof is Ra, 5 nm≤Ra≤30 nm is satisfied.

5. The laminated ceramic electronic component of claim 1, wherein a ceramic powder used for the dielectric layer includes a first ceramic powder and a second ceramic powder having an average particle diameter smaller than that of the first ceramic powder.

6. The laminated ceramic electronic component of claim 5, wherein the average particle diameter of the first ceramic powder is 1.5 times to 4.5 times larger than that of the second ceramic powder.

7. The laminated ceramic electronic component of claim 5, wherein the ceramic powder includes the first ceramic powder in an amount of 70 to 99 parts by weight and the second ceramic powder in an amount of 1 to 30 parts by weight.

8. A laminated ceramic electronic component, comprising:
a ceramic body including a dielectric layer; and
first and second internal electrodes disposed to face each other, having the dielectric layer interposed therebetween within the ceramic body,
in a cumulative distribution of dielectric grains by particle size within the dielectric layer, when an average thickness of the dielectric layer is td, 0.1 μm≤td≤0.5 μm, and when a value of 1% is set to be D1, a value of 50% is set to be D50, and a value of 99% is set to be D99, 2≤D99/D50≤3 and 2≤D50/D1≤3 being satisfied and td/8≤D50≤td/3 being satisfied.

9. The laminated ceramic electronic component of claim 8, wherein when an average roughness of the dielectric layer on a central line thereof is Ra, 5 nm≤Ra≤30 nm is satisfied.

10. The laminated ceramic electronic component of claim 8, wherein when an average thickness of the first and second internal electrodes is te, 0.1 μm≤te≤0.5 μm is satisfied.

11. The laminated ceramic electronic component of claim 8, wherein the average thickness td of the dielectric layer is the average thickness of the dielectric layer in a cross-section taken in length and thickness directions of the ceramic body cut in a central portion in a width direction thereof.

12. The laminated ceramic electronic component of claim 8, wherein a ceramic powder used for the dielectric layer includes a first ceramic powder and a second ceramic powder having an average particle diameter smaller than that of the first ceramic powder.

13. The laminated ceramic electronic component of claim 12, wherein the average particle diameter of the first ceramic powder is 1.5 times to 4.5 times larger than that of the second ceramic powder.

14. The laminated ceramic electronic component of claim 12, wherein the ceramic powder includes the first ceramic powder in an amount of 70 to 99 parts by weight and the second ceramic powder in an amount of 1 to 30 parts by weight.

15. A method of fabricating a laminated ceramic electronic component, comprising:
- preparing a ceramic green sheet using slurry including a first ceramic powder and a second ceramic powder having an average particle diameter smaller than that of the first ceramic powder;
- forming internal electrode patterns on the ceramic green sheet using a conductive metal paste; and
- forming a ceramic body including a dielectric layer and first and second internal electrodes disposed to face each other, having the dielectric layer interposed therebetween, by laminating and sintering the ceramic green sheet,
- in a cumulative distribution of dielectric grains by an average particle diameter thereof within the dielectric layer, when a value of 1% is set to be D1, a value of 50% is set to be D50, and a value of 99% is set to be D99, $2 \leq D99/D50 \leq 3$ and $2 \leq D50/D1 \leq 3$ being satisfied.

16. The method of claim 15, wherein an average thickness td of the dielectric layer satisfies $0.1 \ \mu m \leq td \leq 0.5 \ \mu m$.

17. The method of claim 15, wherein an average thickness td of the dielectric layer and D50 in a value of 50% in the cumulative distribution of the dielectric grains by an average particle diameter thereof satisfy the relationship of $td/8 \leq D50 \leq td/3$.

18. The method of claim 15, wherein when an average roughness of the dielectric layer on a central line thereof is Ra, $5 \ nm \leq Ra \leq 30 \ nm$ is satisfied.

19. The method of claim 15, wherein the average particle diameter of the first ceramic powder is 1.5 times to 4.5 times larger than that of the second ceramic powder.

20. The method of claim 15, wherein the first ceramic powder is contained in an amount of 70 to 99 parts by weight and the second ceramic powder is contained in an amount of 1 to 30 parts by weight, with respect to an overall amount of ceramic powder.

* * * * *